(12) United States Patent
Suganami et al.

(10) Patent No.: US 7,247,004 B2
(45) Date of Patent: Jul. 24, 2007

(54) ELECTRONICALLY CONTROLLED ACTUATOR

(75) Inventors: Masayuki Suganami, Hitachinaka (JP); Hiroaki Saeki, Hitachinaka (JP); Shigeki Yamada, Hitachinaka (JP)

(73) Assignees: Hitachi, Ltd., Tokyo (JP); Hitachi Car Engineering Co., Ltd., Hitachinaka-shi (JP)

( * ) Notice: Subject to any disclaimer, the term of this patent is extended or adjusted under 35 U.S.C. 154(b) by 16 days.

(21) Appl. No.: 10/355,041

(22) Filed: Jan. 31, 2003

(65) Prior Publication Data

US 2003/0185672 A1  Oct. 2, 2003

(30) Foreign Application Priority Data

Mar. 27, 2002  (JP) .............................. 2002-088001

(51) Int. Cl.
*F04B 17/00* (2006.01)
*F04B 35/00* (2006.01)

(52) U.S. Cl. .................. 417/408; 417/405; 417/406; 417/407

(58) Field of Classification Search ................ 417/405, 417/406, 407, 408, 409; 60/600, 601, 602, 60/603; 415/159, 160, 163
See application file for complete search history.

(56) References Cited

U.S. PATENT DOCUMENTS

| 3,364,772 | A | * | 1/1968 | Easton | 74/421 A |
| 4,291,535 | A | * | 9/1981 | Goloff | 60/602 |
| 4,353,685 | A | * | 10/1982 | Osborn et al. | 417/406 |
| 4,726,744 | A | * | 2/1988 | Arnold | 417/407 |
| 4,770,603 | A | | 9/1988 | Engels et al. | |
| 4,804,316 | A | * | 2/1989 | Fleury | 417/407 |
| 4,928,489 | A | * | 5/1990 | Inoue et al. | 60/602 |
| 4,953,110 | A | * | 8/1990 | Chartrand | 701/101 |
| 6,220,233 | B1 | * | 4/2001 | Pierpont | 123/568.12 |
| 2002/0163279 | A1 | * | 11/2002 | Mueller et al. | 310/239 |
| 2003/0024338 | A1 | * | 2/2003 | Roither et al. | 74/425 |
| 2004/0012281 | A1 | * | 1/2004 | Neubauer et al. | 310/75 R |

FOREIGN PATENT DOCUMENTS

| JP | 62-093428 | 4/1987 |
| JP | 62-162730 | 7/1987 |
| JP | 06-351195 | 12/1994 |
| JP | 08-070553 | 3/1996 |
| JP | 08-216659 | 8/1996 |
| JP | 10-248212 | 9/1998 |
| JP | 2000-304569 | 11/2000 |
| JP | 2001-128407 | 5/2001 |

* cited by examiner

*Primary Examiner*—Emmanuel Sayoc
*Assistant Examiner*—Ryan P Gillan
(74) *Attorney, Agent, or Firm*—Crowell & Moring LLP

(57) ABSTRACT

An electronically controlled actuator for controlling a turbocharger has a motor, a speed change mechanism and a position sensor contained in a case consisting of a body and a cover. The driving force of the motor is transmitted through the speed change mechanism to an output shaft to drive the movable vanes of a turbocharger for turning. A first bearing supporting the output shaft for rotation is held on the cover, and a second bearing supporting the output shaft for rotation is held on the body. The position sensor is mounted on the output shaft of the motor. The reliability of the actuator is improved.

19 Claims, 7 Drawing Sheets

ELECTRONICALLY CONTROLLED ACTUATOR

BACKGROUND OF THE INVENTION

The present invention relates to an electronically controlled actuator, and more particularly, to an electronically controlled actuator suitable for the positional control of the movable vanes of a variable-capacity turbocharger for an automotive internal combustion engine.

A prior art electronically controlled actuator disclosed in, for example, EP-A No. 109088/1999 includes a motor and a speed change mechanism. In this prior art electronically controlled actuator, one end of an output shaft included in the speed change mechanism is connected to a driven member and the other end of the same is provided with a position sensor. The position sensor measures the present working position of the actuator and provides data to be used for the feedback control of the working position. The output shaft is supported for rotation in two bearings. The motor and the speed change mechanism are held in a case having a body and a cover.

Since one end of the output shaft of the speed change mechanism of this prior art electronically controlled actuator is used for transmitting driving force to an external device and other end of the same is provided with the position sensor, both the two bearings supporting the output shaft for rotation are disposed in the body at a small interval and hence the inclination of the output shaft increases. Consequently, 1) vibration resistance is reduced and 2) errors are introduced in measured positions due to an increase in the vibration of the position sensor.

First, the increase in the inclination of the output shaft increases the vibration of the output shaft in directions perpendicular to the axis of the output shaft. Consequently, fretting abrasion occurs in surfaces in contact under pressure of the speed change mechanism comprising a worm gear and a worm wheel, which abrasion shortens the life of the actuator.

Secondly, if the output shaft of the actuator shakes while the driven member is at a standstill, the output of the position sensor varies. Although the driven member is at a standstill at a normal position, the variation of the output of the position sensor is considered to indicate that the driven member is moving and a control signal to drive the driven member is provided. Consequently, the driven member is operated wrongly. Thus, the reliability of the actuator is reduced.

SUMMARY OF THE INVENTION

Accordingly, it is an object of the present invention to provide a highly durable, reliable electronically controlled actuator for controlling a turbocharger.

(1) With the foregoing object in view, the present invention provides an electronically controlled actuator for driving a driven member for rotation comprising: a motor; a speed change gear including an output shaft driven by the motor and capable of driving the driven member; a position sensor; and a case including a body and a cover to contain the motor, the speed change gear and the position sensor. A first bearing supporting the output shaft for rotation is held on the cover, a second bearing supporting the output shaft for rotation is held on the body, and the position sensor is attached to the output shaft of the motor.

Since the position sensor is attached to the output shaft of the motor, measures the turning angle of the output shaft of the motor to control the output shaft of the actuator, the vibrations of the output shaft are not transmitted to the position sensor and hence the reliability can be improved. Since the two bearings are mounted on the body and the cover, respectively, the two bearings can be disposed at an increased interval. Therefore, the vibration of the output shaft can be limited to the smallest possible extent, fretting abrasion can be limited to the least possible extent, and the reliability can be improved.

(2) The present invention provides an electronically controlled actuator for driving a driven member for rotation comprising: a motor; a speed change gear including an output shaft driven by the motor and capable of driving the driven member; a position sensor; and a case including a body and a cover to contain the motor, the speed change gear and the position sensor. A power supply connector for supplying power to the motor is formed on the cover, a bearing held on the cover supports one end of the output shaft, and the driven member is a turbocharger.

Since the cover is provided with the power supply connector for supplying power to the motor, and the bearing supporting one end of the output shaft, the cover serves also as both the connector and the bearing.

(3) The present invention provides an electronically controlled actuator for driving a driven member for rotation comprising: a motor; a speed change gear including an output shaft driven by the motor and capable of driving the driven member; a position sensor; a case including a body and a cover to contain the motor, the speed change gear and the position sensor. Connecting terminals are plugged in and connected to power supply terminals formed on the motor are formed on the cover, a bearing held on the cover supports one end of the output shaft, and the driven member is a turbocharger.

Since the cover is provided with the connecting terminals to be plugged in and connected to the power supply terminals formed on the motor, both supporting the output shaft in the bearing and electrical connection of the connecting terminals to the motor can be simultaneously achieved by attaching the cover to the body.

(4) The present invention provides an electronically controlled actuator for driving a driven member for rotation comprising: a motor; a speed change gear including an output shaft driven by the motor and capable of driving the driven member; a position sensor; and a case including a body and a cover to contain the motor, the speed change gear and the position sensor. A motor control circuit is attached to the cover, a bearing held on the cover supports one end of the output shaft, the cover is provided with a partition wall separating the bearing from the control circuit, and the driven member is a turbocharger.

Since the motor control circuit is attached to the cover and the bearing held on the cover supports one end of the output shaft, and the cover is provided with the partition wall separating the bearing from the control circuit, the control circuit attached to the cover can be protected from contamination with a lubricant lubricating the bearing supporting the output shaft.

(5) The present invention provides an electronically controlled actuator for driving a driven member for rotation comprising: a motor; a speed change gear including an output shaft driven by the motor and capable of driving the driven member; a position sensor; and a case including a body and a cover to contain the motor, the speed change gear and the position sensor. The position sensor is mounted on the output shaft of the motor coaxially with the output shaft, the driven member is a turbocharger, and the angular position of the movable vanes of the turbocharger is controlled on the basis of the output of the position sensor.

Since the position sensor is disposed coaxially with the output shaft of the motor, the angular position of the movable vanes of a turbine included in the turbocharger is hardly affected by disturbances (temperature and vibration) and can be accurately measured, and the angular position of the movable vanes of the turbocharger can be accurately controlled.

(6) The present invention provides an electronically controlled actuator for driving a driven member for rotation comprising: a motor; a speed change gear including an output shaft driven by the motor and capable of driving the driven member; a position sensor; and a case including a body and a cover to contain the motor, the speed change gear and the position sensor. The output shaft has opposite ends supported in first and second bearings, respectively, the driven member is a turbocharger, and the angular position of the movable vanes of the turbocharger is controlled on the basis of the output of the position sensor.

Since the opposite ends of the output shaft are supported in the first and the second bearing, respectively, the vibration of the output shaft can be limited to the least extent, fretting abrasion can be limited to the least extent and the reliability can be improved.

(7) The present invention provides a turbocharger with electronically controlled actuator comprising an electronically controlled actuator comprising a motor, a speed change gear including an output shaft driven by the motor, a position sensor, and a case including a body and a cover to contain the motor, the speed change gear and the position sensor; and a turbocharger having movable blades. The output shaft has opposite ends supported in first and second bearings, and the angular position of the movable vanes of the turbocharger is controlled on the basis of the output of the position sensor of the electronically controlled actuator.

Since the opposite ends of the output shaft are supported in the first and the second bearing, respectively, and the angular position of the movable vanes of the turbocharger is controlled on the basis of the output of the position sensor of the electronically controlled actuator, the reliability of the turbocharger with electronically controlled actuator can be improved.

(8) The present invention provides an electric actuator comprising: a body; a motor held on the body; an output shaft; a gearing for transmitting the rotation of the output shaft of the motor to the output shaft to drive the output shaft for rotation; a bearing held on the body and supporting one end of the output shaft; and a resin cover fixed to the body so as to cover the motor, the gearing and the other end of the output shaft. The cover is provided with a power supply connector for supplying power to the motor on its outer surface, and terminals electrically connected to the power supply connector and to the motor on its inner surface, and a bearing has an inner race fixedly mounted on the other end of the output shaft and an outer race fixed to the cover.

Thus, the resin cover serves also as both an electric connector and a bearing holder.

(9) The present invention provides an electric actuator comprising: a body; a motor held on the body; an output shaft; a gearing for transmitting the rotation of the output shaft of the motor to the output shaft to drive the output shaft for rotation; a bearing held on the body and supporting one end of the output shaft; and a resin cover fixed to the body so as to cover the motor, the gearing and the other end of the output shaft. The resin cover is provided with electric terminals capable of being plugged in and connected to the power supply terminals of the motor and combined therewith by molding, and with a bearing holding part for holding an outer race included in a bearing having an inner race fixedly mounted on the other end of the output shaft.

Thus, the output shaft can be supported and the motor can be electrically connected to the electric terminals by attaching the resin cover to the body.

(10) The present invention provides an electric actuator comprising: a body; a motor held on the body; an output shaft; a gearing for transmitting the rotation of the output shaft of the motor to the output shaft to drive the output shaft for rotation; a bearing held on the body and supporting one end of the output shaft; and a resin cover fixed to the body so as to cover the motor, the gearing and the other end of the output shaft. A control circuit for controlling the motor is attached to the inner surface of the resin cover and is electrically connected to a connector formed on the outer surface of the resin cover, and the resin cover is provided with a partition wall holding an outer race included in a bearing having an inner race fixedly mounted on the other end of the output shaft and separating the control circuit from the bearing.

Thus, the control circuit attached to the resin cover can be protected from contamination with a lubricant lubricating the bearing supporting the output shaft.

(11) The present invention provides a movable-vane turbine comprising: movable vanes; and an output shaft driven for rotation by a motor and capable of controlling the angular position of the movable vanes. A magnetic encoder is combined with the output shaft of the motor, and the angular position of the movable vanes is physically controlled such that the angular position of the movable vanes varies as a function of the number of output pulses provided by the magnetic encoder.

Thus, the angular position of the movable vanes of the turbine can be accurately controlled regardless of disturbances (temperature and vibration).

(12) The present invention provides a movable-vane turbine comprising: movable vanes; a motor; an output shaft driven for rotation by the motor and capable of controlling the angular position of the movable vanes; a gearing for transmitting the rotation of the output shaft of the motor to the output shaft to drive the output shaft for rotation; a body holding the motor and provided with a bearing supporting one end of the output shaft; and a resin cover fixed to the body so as to cover the motor, the gearing and the other end of the output shaft. A magnetic encoder is combined with the output shaft of the motor, a control circuit for controlling the motor is attached to a part opposite to the magnetic encoder of the inner surface of the resin cover and is connected electrically to a connector formed on the outer surface of the resin cover, and a magnetoelectric conversion device for measuring the variation of the magnetic flux of the magnetic encoder is attached to the control circuit.

Thus, the functions of both the control circuit for controlling the motor of the actuator of the movable-vane turbine and part of a rotation sensor are available.

(13) In the movable-vane turbine stated in item (12), the resin cover is provided with a partition wall for separating the magnetoelectric conversion device from the magnetic encoder.

Thus, the contamination of the magnetoelectric conversion device with grease lubricating the bearings and powder produced by abrasion can be suppressed.

(14) In the movable-vane turbine stated in item (12), the electric terminals of the motor, and a bearing mount for supporting a bearing supporting the other end of the output shaft are formed on the inner surface of the resin cover on the opposite sides of the control circuit, respectively.

Thus, the resin cover is able to hold the control circuit for controlling the motor of an actuator for the movable-vane turbine, part of a rotation sensor, and the bearing.

BRIEF DESCRIPTION OF THE DRAWINGS

Other objects and advantages of the invention will become apparent from the following description of embodiments with reference to the accompanying drawings in which.

DETAILED DESCRIPTION OF THE CURRENTLY PREFERRED EMBODIMENTS

Figure 1:
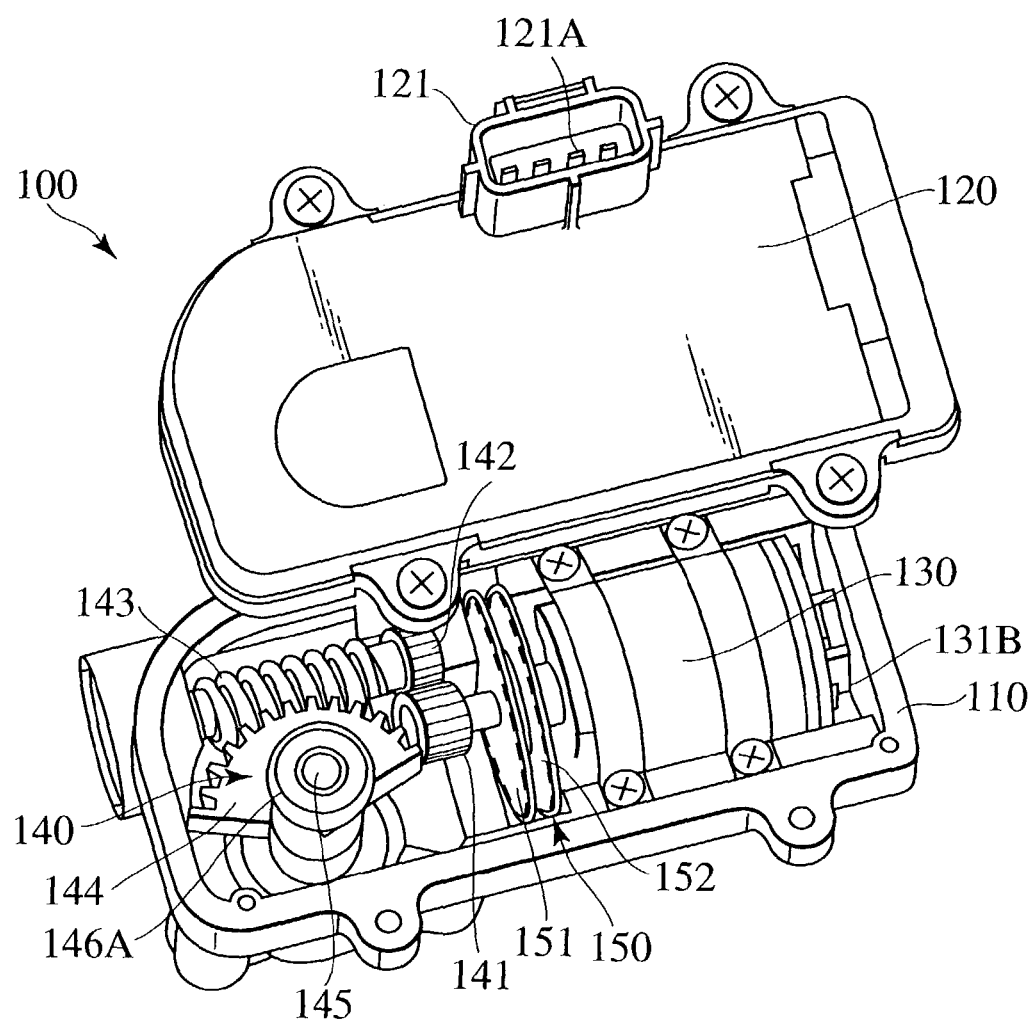
FIG. 1 is a perspective view of an electronically controlled actuator in a preferred embodiment, in which a cover is separated.

First, the construction of the electronically controlled actuator in the preferred embodiment will be described with reference to FIGS. 1 to 4.

In FIGS. 1 to 4, the same reference characters designate the same parts, respectively.

Referring to FIG. 1, the electronically controlled actuator 100 in the preferred embodiment comprises a body 110, a cover 120, a motor 130, a speed change mechanism 140, and a position sensor 150. The motor 130, the speed change mechanism 140 and the position sensor 150 are arranged in a space between the body 110 and the cover 120.

Bands and screws fasten the motor 130 to the body 110. A power supply connector 121 is formed integrally with the cover 120. The motor 130 is a dc motor with brushes by way of example.

The speed change mechanism 140 comprises a pinion 141, a gear 142, a worm 143, a worm wheel 144, and an output shaft 145. The pinion 141 is fixedly mounted on the output shaft of the motor 130 by press fitting. The pinion 141 and the gear 142 are engaged. The gear 142 and the worm 143 are integrally formed of the same material in a coaxial arrangement. The gear 142 and the worm 143 may be separately formed of different materials, respectively. If the gear 142 and the worm 143 are formed separately, the same may be coaxially bonded together with an adhesive or the like.

The worm 143 and the worm wheel 144 are engaged with each other. The output torque of the motor 130 is transmitted from the pinion 141 to the gear 142 to lower or raise the output rotating speed. The rotation of the worm 143 is transmitted to the worm wheel 144 to lower or raise the output speed of the worm wheel 144. The turning of the wheel gear 144 is transmitted to the output shaft 145 of the actuator. A first bearing 146A is mounted on the output shaft 145. A second bearing 146B will be described later with reference to FIG. 4.

Figure 3:
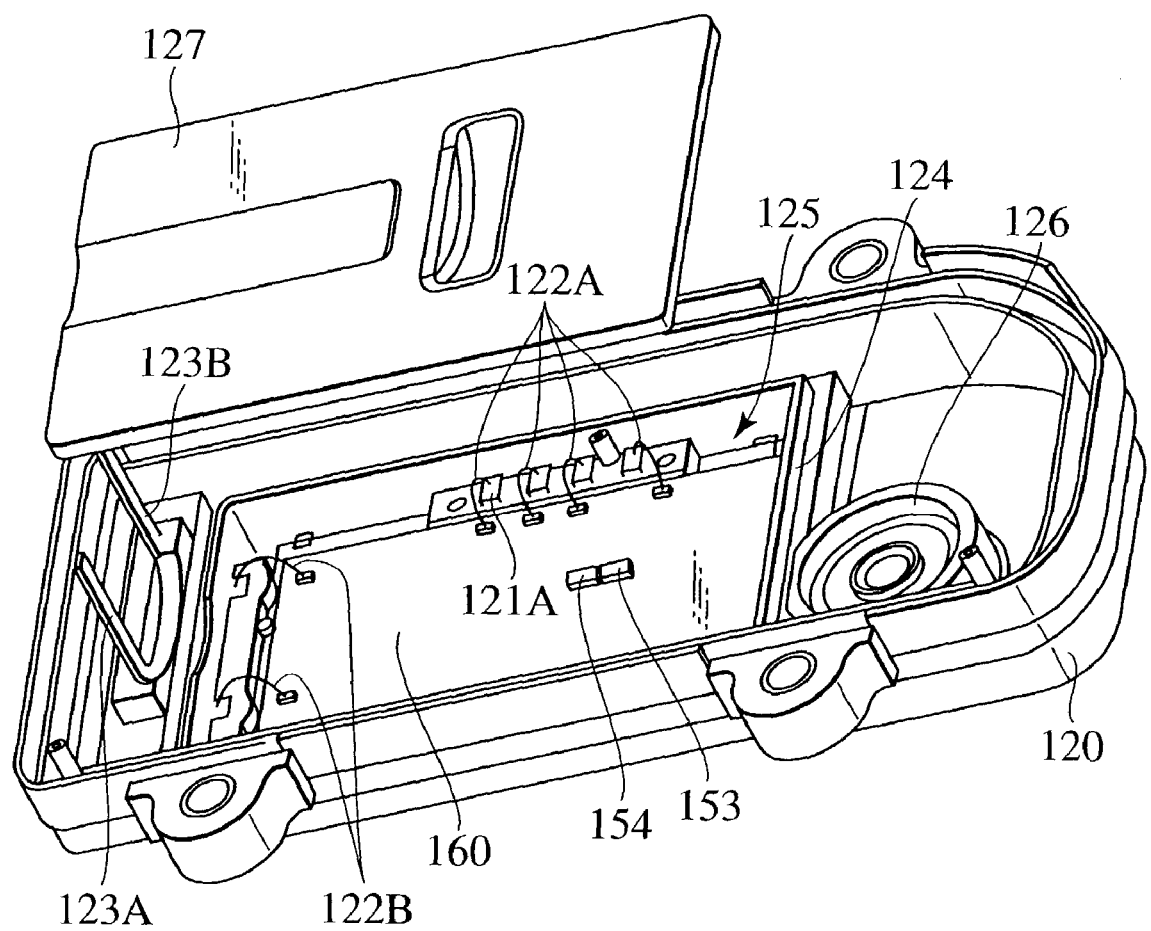
FIG. 3 is a perspective view showing the interior of a cover included in the electronically controlled actuator in the preferred embodiment.

The electronically controlled actuator in the preferred embodiment is used for the positional control of the movable vanes of a turbocharger, i.e., a driven member. The position sensor 150 is provided to measures the position of the movable vanes. The position sensor 150 comprises magnetic plates (encoder disks) 151 and 152 and Hall ICs 153 and 154, which will be described later with reference to FIG. 3. The magnetic plates 151 and 152 are fixedly mounted on the output shaft of the motor 130 coaxially with the same. As shown in FIG. 3, the Hall ICs 153 and 154 are attached to a control circuit 160 at positions opposite to the peripheral edges of the magnetic plates 151 and 152, respectively. The magnetic flux densities of magnetic fields created by the magnetic plates 151 and 152 and applied to the Hall ICs 153 and 154 vary as the magnetic plates 151 and 152 rotate. The outputs of the Hall ICs 153 and 154 can be changed between high and low by changing the magnetic flux densities. The position sensor 150 is a magnetic encoder consisting of the magnetic plates 151 and 152, and the Hall ICs 153 and 154.

The magnetic plates 151 and 152 are formed of, for example, a resin, such as PPS, so that the magnetic plates 151 and 152 have a small moment of inertia when rotated by the motor to reduce a delay in starting the motor while the actuator is stopped. The magnetic plates 151 and 152 are fixedly mounted on the output shaft of the motor 130 or the pinion 141 with an adhesive. The magnetic plates 151 and 152 may be formed integrally with the output shaft of the motor 130 or the pinion 141.

Magnets are embedded in the magnetic plates 151 and 152 at equal angular pitches such that the same magnetic poles lie in a peripheral part of the magnetic plates 151 and 152. Magnetic flux densities of magnetic fluxes applied to magnetic flux measuring devices, not shown, included in the Hall ICs 153 and 154 are changed alternately to make the Hall ICs 153 and 154 go on and off. The variation of the magnetic flux produced by the magnetic plate 151 varies the output of the Hall IC 153, and the variation of the magnetic flux produced by the magnetic plate 152 varies the output of the Hall IC 154.

The phase difference between the respective output phases of the magnetic plates 151 and 152 is a quarter of the period. It is possible to know whether the output shaft of the motor 130 is rotating in the normal direction or in the reverse direction from the mode of superposition of the on-off patterns.

The working angle of the movable vane of the turbocharger is physically controlled such that the working angle of the movable vanes varies as a function of the number of output pulses provided by the position sensor 150, i.e., the magnetic encoder. For example, the relation between the working angle of the movable vanes and the number of output pulses provided by the position sensor 150 is defined by Expression (1), where $\theta_v$ is the working angle of the movable vanes, P is the number of pulses, n is the total speed reduction ratio of the speed change mechanism consisting of the pinion 141, the gear 142, the worm 143 and the worm wheel 144, and $\theta_e$ is the angular pitch of the magnets of the magnetic plate 151.

$$\theta_v = p \times (\theta_e/n) \qquad (1)$$

The number P of the output pulses is an integer, and $\theta_e/n$ indicates the angular resolution of the actuator in this embodiment. When the rotating speed of the output shaft 145 should be higher than that of the output shaft of the motor 130, the total speed reduction ratio n is smaller than 1 for speed increasing. The motor 130 employed in the actuator in this embodiment is a small, high-speed, low-torque motor. Therefore, the total speed reduction ratio n>1, to drive the output shaft 145 by a desired torque for rotation at a desired rotating speed. In this embodiment, the magnetic plate 152 is used only for determining the rotating speed of the output shaft of the motor 130 on the basis of the output phase difference. Since a pulse signal of a period equal to a quarter of the period of pulses provided by only the Hall IC 153 can be obtained by performing a logical AND operation between the outputs of the Hall ICs 153 and 154 driven by the magnetic plates 151 and 152, the angular resolution may be further raised.

As apparent from the foregoing description, this embodiment is characterized in that the magnetic plates 151 and 152 forming the position sensor 150 are mounted on the output shaft of the motor 130. In the prior art actuator, the position sensor is mounted on the output shaft of the speed change mechanism and hence the reliability is reduced when the output shaft of the speed change mechanism vibrates. In this embodiment, the position sensor is mounted on the output shaft of the motor and measures the angle of rotation of the output shaft of the motor to control the output shaft of the actuator. Accordingly, the vibration of the output shaft of the actuator is not transmitted to the position sensor and hence the reliability can be improved. It may be also said that the positions of the magnetic plates 151 and 152 are on the input shaft of the speed change mechanism 140.

When the speed change mechanism 140 is a reduction gear, the position of the position sensor 150 is on the side of the power source (motor 130) with respect to the reduction gear (total speed reduction ratio n). Therefore, the sensor resolution may be 1/n of the angular resolution necessary for controlling the output shaft, sensitivity to erroneous measurement due to runout caused by vibrations is low, and hence erroneous measurement occurs scarcely. Thus, the erroneous position measurement of the position sensor can be avoided. The overall resolution of the position sensor can be multiplied by n if the sensor resolution of the magnetic plate is the same as the conventional one.

Figure 2:
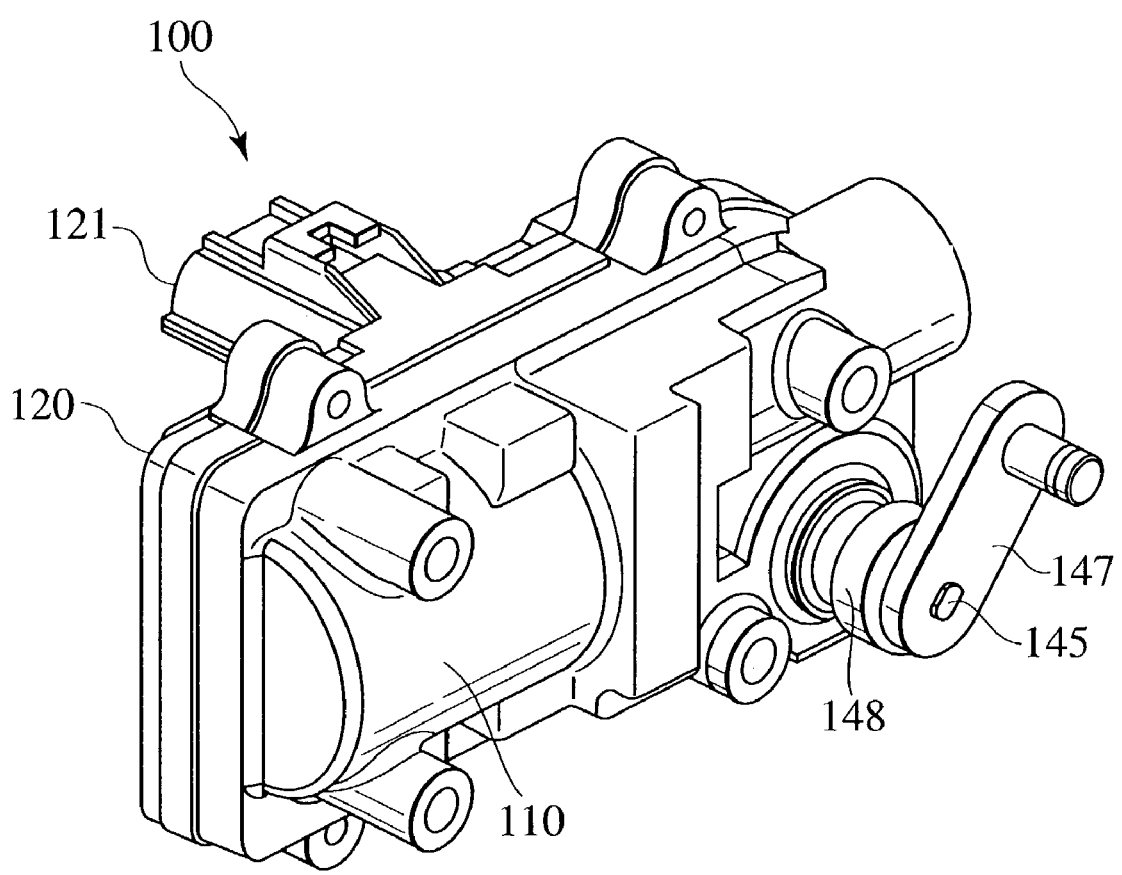
FIG. 2 is a perspective view of the electronically controlled actuator in the preferred embodiment.
Figure 5:
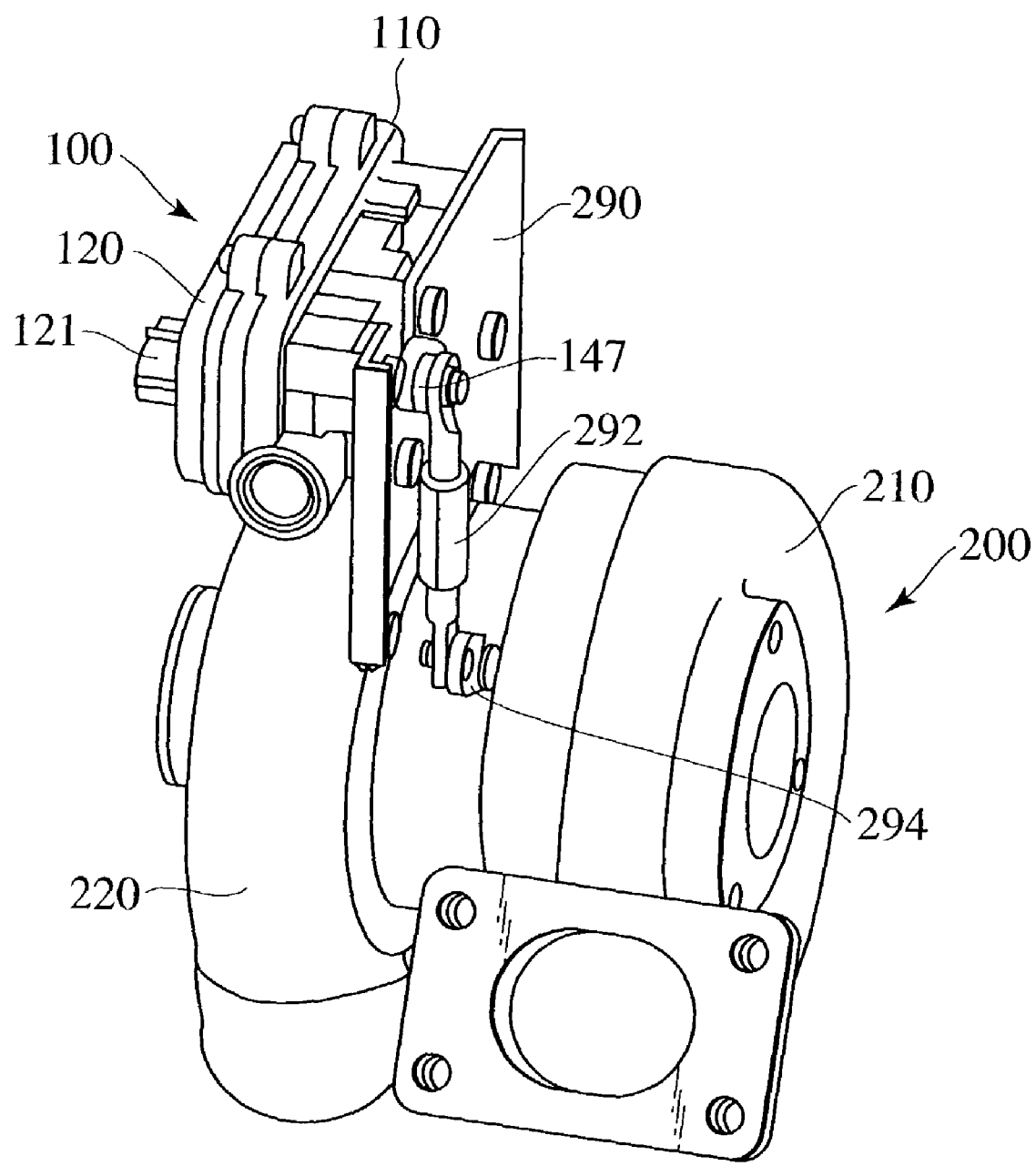
FIG. 5 is a perspective view of a variable-capacity turbocharger provided with the electronically controlled actuator in the preferred embodiment.

Referring to FIG. 2, a link 147 is fixedly mounted on the output shaft 145. A swing motion of the link 147, which will be described later with reference to FIG. 5, is transmitted by a link 292 to a turbocharger 200 to operate the movable vanes 230 of the turbocharger 200 for position control. A cover 148 is joined to a base part of the link 147 to prevent the entry of external dust into the actuator 100.

The cover 120 will be described in connection with FIG. 3. The cover 120 is joined to the body 110 fixedly holding the motor 130 and the speed change mechanism 140 therein as shown in FIG. 2 to protect the motor 130, the speed change mechanism 140 and the position sensor 150 from external moisture, oil and dust. The cover 120 has the following functions.

As shown in FIG. 1, the power supply connector 121 is formed integrally with the cover 120 to supply power to the motor 130 and the control circuit 160. Terminals of the power supply connector 121 are connected to the terminals of the control circuit 160 with aluminum wires 122A by vibration welding (wire bonding). Power is supplied from an external power source through the power supply connector 121 and the aluminum wires 122A to the control circuit 160. Terminals of the control circuit 160 are connected to motor terminals 123A and 123B with aluminum wires 122B by wire bonding.

The motor 130 is provided with two female terminals 131B as shown in FIG. 1, in which only one of the two female terminals 131B is shown. The motor terminals 123A and 123B are embedded in the cover 120. The motor terminals 123A and 123B embedded in the cover 120 come into electrical contact with the female terminals 131B when the cover 120 is joined to the body 110. Power applied to the power supply connector 121A is supplied through the control circuit 160 and the motor terminals 123A and 123B to the motor 130.

The cover 120 is integrally provided with a rectangular partition wall 124. The control circuit 160 is fixed to the cover 120 with an adhesive or the like in a space 125 surrounded by the partition wall 124. The control circuit 160 is bonded to a flat part of the cover 120 in the space 125 with, for example, an epoxy adhesive. The space 125 is isolated from a bearing holding part 126 formed in the cover 120 by the partition wall 124. A control circuit cover 127 is bonded to the end surface of the partition wall 124 with an adhesive to isolate the control circuit 160 from a space around the bearing holding part 126. Thus, the contamination of the control circuit 160 with particles produced by the abrasion of the bearing when the output shaft 145 rotates or with scattered grease and troubles in the circuit due to short circuit can be prevented.

Figure 4:
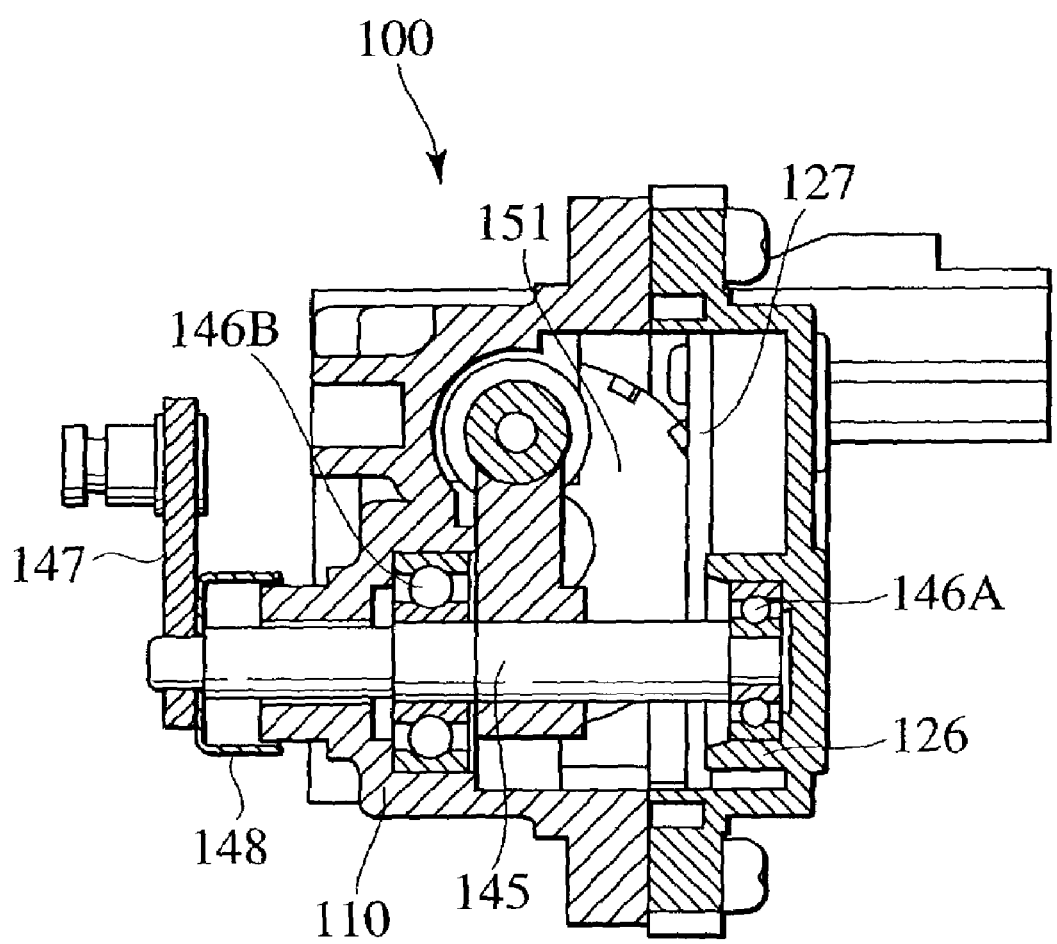
FIG. 4 is a sectional view of the electronically controlled actuator in the preferred embodiment.

A bearing structure for supporting the output shaft 145 of the actuator 100 will be described with reference to FIG. 4. As shown in FIG. 4, the output shaft is supported in the two ball bearings 146A and 146B. The first ball bearing 146A has an outer race held in the bearing holding part 126 formed of the same material as that of the cover 120 integrally with the cover 120. The first ball bearing 146A sustains axial and radial loads. The outer race of the ball bearing 146A is fitted in the bearing holding part 126 in a clearance fit. The inner race of the ball bearing 146A is mounted on the output shaft 145 in a press fit. The second ball bearing 146B has an outer race fitted in a bearing holding part of the body 110 in a press fit, and an inner race mounted on the output shaft 145 in a press fit. The link 147 is mounted on an output end part of the output shaft 145, and the output end part is covered with the watertight cover 148 to prevent the entry of moisture in the actuator when the actuator is splashed with water.

In this embodiment, the position sensor 150 is combined with the output shaft of the motor 130 as shown in FIG. 1. Therefore, the two bearings (the ball bearings 146A and 146B) can be held on the body 110 and the cover 120, respectively, and the two bearings can be spaced the longest possible distance apart. Hence, the vibration of the output shaft caused by the vibration of the internal combustion engine can be limited to the greatest extent. Consequently, fretting abrasion can be limited to the least extent and the durability of the actuator can be enhanced. Since the opposite ends of the output shaft 145 are supported in the ball bearings, an increase in resistance against the sliding motion of the bearing parts can be limited to the least extent when an offset load is applied to the output shaft 145 in a direction perpendicular to the axis of the output shaft 145.

A variable-capacity turbocharger provided with the electronically controlled actuator in this embodiment will be described with reference to FIGS. 5 to 8.

In FIGS. 5 to 8, the same reference characters designate the same parts, respectively.

Referring to FIG. 5, the electronically controlled actuator 100 is fastened to a bracket 290 fixed to a compressor housing 220 of a variable-capacity turbocharger 200 with screws or the like. The variable-capacity turbocharger 200 has a turbine housing 210 in addition to the compressor housing 220. Exhaust gases discharged from an internal combustion engine flows through the turbine housing 210 and hence the turbine housing 210 is heated at a high temperature. Since temperature rise in the compressor housing 220 is comparatively small, heat transfer from the turbine housing 210 to the electronically controlled actuator 100 can be avoided. The bracket 290 serves also as a shield for intercepting radiant heat emitted by the turbine housing 210.

The link 147 of the electronically controlled actuator 100 is connected to a rod 294 supported on the turbine housing 210 by a movable link 292. Thus, the turning motion of the output shaft of the electronically controlled actuator 100 is transmitted through the movable link 292 to the rod 294.

Figure 6:
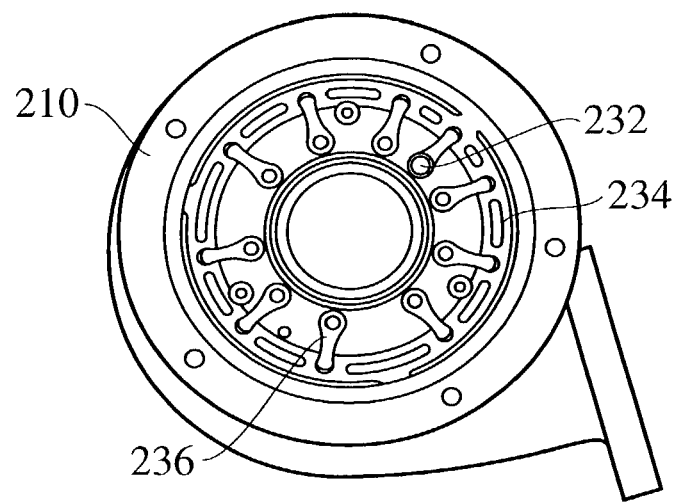
FIG. 6 is an end view of the variable-capacity turbocharger provided with the electronically controlled actuator in the preferred embodiment showing the arrangement of vane links in a turbine housing.

A drive link 232 shown in FIG. 6 is connected to the rod 294 shown in FIG. 5 coaxially with the rod 294. As shown in FIG. 6, a turning motion of the drive link 232 is transmitted to a ring 234 to turn the ring 234. A plurality of vane links 236 arranged on a circle in the turbine housing 210 are turned through the same angle by the ring 234 when the ring 234 is turned.

Figure 7:
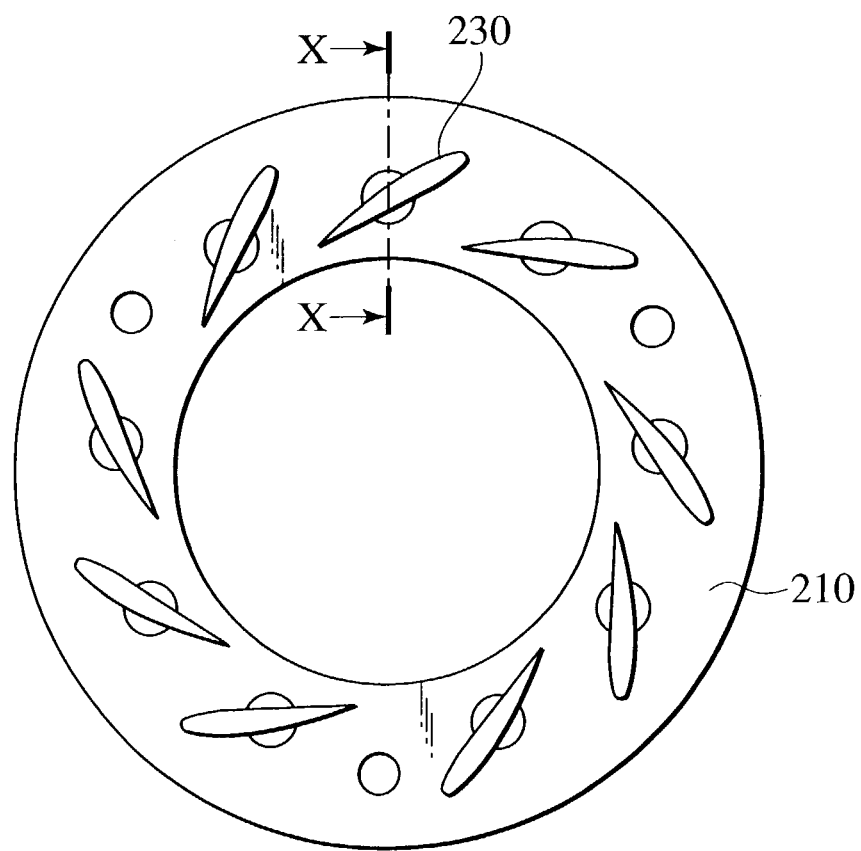
FIG. 7 is a view showing the arrangement of variable vanes of the variable-capacity turbocharger provided with the electronically controlled actuator in the preferred embodiment.
Figure 8:
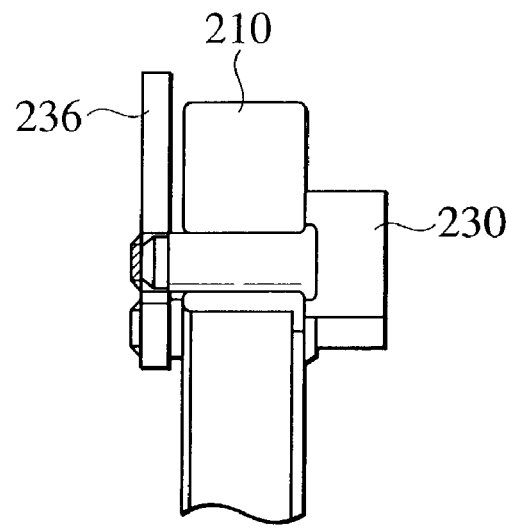
FIG. 8 is a sectional view taken on line X—X in FIG. 7.

As shown in FIG. 7, the plurality of movable vanes 230 are supported for turning on the turbine housing 210. As shown in FIG. 8, the movable vanes 230 are connected coaxially to the vane links 236. The movable vanes 230 turn when the vane links 236 are turned. Thus, the turning motion of the output shaft of the electronically controlled actuator 100 turns the movable vanes 230 to control the flow of the exhaust gases flowing through the turbine housing 210.

A control system for controlling the variable-capacity turbocharger provided with the electronically controlled actuator in this embodiment will be described with reference to FIG. 9.

Figure 9:
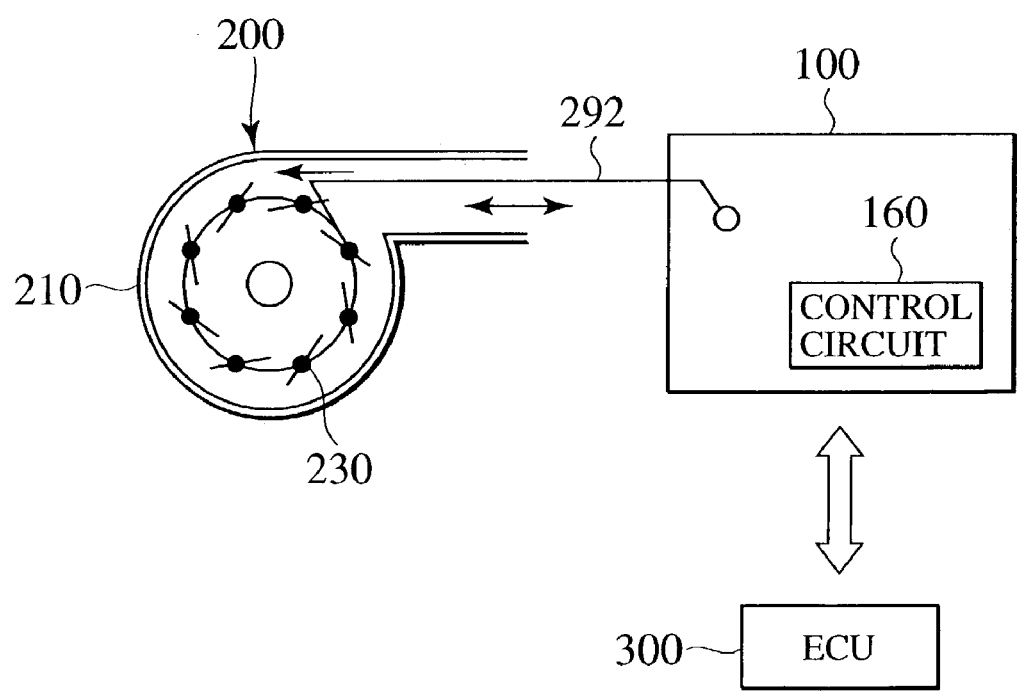
FIG. 9 is a schematic diagram showing a system including the variable-capacity turbocharger provided with the electronically controlled actuator in the preferred embodiment.

FIG. 9 shows a system including the variable-capacity turbocharger 200 provided with the electronically controlled actuator in this embodiment. In FIG. 9, the same reference characters designate the same parts as used in FIGS. 1 to 8.

The plurality of movable vanes 230 are arranged in the turbine housing 210 of the variable-capacity turbocharger 200. The movable vanes 230 are supported for turning and are interlocked with the movable link 292. The movable link 292 is connected pivotally to the output shaft of the actuator 100.

The flow of the exhaust gases through the turbine housing 210 is adjusted by adjusting the angular position of the movable vanes 230 to adjust compression pressure of the compressor to a desired value. The operation of the electronically controlled actuator 100 is controlled by the control circuit 160 included in the actuator and fixed with the adhesive to a part of the actuator. The control circuit 160 compares measured position data provided by the position sensor included in the actuator, and desired position data represented by a signal received from a engine control unit (ECU) 300 included in the internal combustion engine, and controls the actuator 100 according to the difference between the measured and the desired position data.

As is apparent from the foregoing description, in the embodiment of the present invention, the output shaft is supported for rotation in the first bearing on the body and in the second bearing on the cover, and the position sensor is combined with the output shaft of the motor. Thus, the position sensor is combined with the output shaft of the motor and measures the angle of rotation of the output shaft of the motor to control the output shaft of the actuator. Therefore, the vibration of the output shaft of the actuator is not transmitted to the position sensor and hence the reliability is improved. Since the two bearings are held on the body and the cover, respectively, the two bearings can be spaced the longest possible distance apart, and hence the vibration of the output shaft can be limited to the least extent. Consequently, fretting abrasion can be limited to the least extent and the reliability of the actuator can be improved.

Since the cover is provided with the power supply connector for supplying power to the motor and the bearing supporting one end of the output shaft is held on the cover, the cover is able to serve as both a connector and a bearing.

Since the motor terminals 123A and 123B to be connected to the power supply terminals of the motor are embedded in the cover, both supporting the output shaft and electrically connecting the motor to the power supply terminals can be achieved by joining the cover to the body.

Since the control circuit for controlling the motor is held on the cover, the bearing supporting the one end of the output shaft is held on the cover, and the cover is provided with the partition wall isolating the control circuit from the bearing, the control circuit held on the cover can be prevented from being contaminated with the lubricant lubricating the bearings supporting the output shaft.

Since the position sensor is combined with the output shaft of the motor coaxially with the same, the angular position of the movable vanes are hardly affected by disturbances (temperature and vibration) and can be accurately measured, and the angular position of the movable vanes of the turbocharger can be accurately controlled.

Since the output shaft has the opposite ends supported for rotation in the first and the second bearing, the vibration of the output shaft can be limited to the least extent, fretting abrasion can be limited to the least extent and the reliability can be improved.

Since the output shaft has the opposite ends supported for rotation in the first and the second bearing, and the angular position of the movable vanes of the turbocharger is controlled on the basis of the output of the position sensor of the electronically controlled actuator, the reliability of the turbocharger with electronically controlled actuator can be improved.

According to the invention, the durability of the actuator can be enhanced and the reliability of the actuator can be improved.

According to the invention, the cover is provided with the power supply connector for supplying power to the motor, and the bearing supporting one end of the output shaft is held on the cover. Therefore, the cover serves also as both a connector and a bearing.

According to the invention, since the cover is provided with the connecting terminals to be plugged in and connected to the power supply terminals formed on the motor, both supporting the output shaft in the bearing and electrical connection of the connecting terminals to the motor can be simultaneously achieved by attaching the cover to the body.

According to the invention, since the motor control circuit is attached to the cover and the bearing held on the cover supports one end of the output shaft, and the cover is provided with the partition wall separating the bearing from the control circuit, the control circuit attached to the cover can be protected from contamination with a lubricant lubricating the bearing supporting the output shaft.

According to the invention, since the position sensor is disposed coaxially with the output shaft of the motor, the angular position of the movable vanes of the turbine of the turbocharger is hardly affected by disturbances (temperature and vibration) and can be accurately measured, and the angular position of the movable vanes of the turbocharger can be accurately controlled.

According to the invention, since the opposite ends of the output shaft are supported in the first and the second bearing, respectively, the vibration of the output shaft can be limited to the least extent, fretting abrasion can be limited to the least extent and the reliability can be improved.

According to the invention, since the opposite ends of the output shaft are supported in the first and the second bearing, respectively, and the angular position of the movable vanes of the turbocharger is controlled on the basis of the output of the position sensor of the electronically controlled actuator, the reliability of the turbocharger with electronically controlled actuator can be improved.

According to the invention, the resin cover serves also as both an electric connector and a bearing holder.

According to the invention, the output shaft can be supported and the motor can be electrically connected to the electric terminals by attaching the resin cover to the body.

According to the invention, the control circuit attached to the resin cover can be protected from contamination with a lubricant lubricating the bearing supporting the output shaft.

According to the invention, the angular position of the movable vanes of the turbine can be accurately controlled regardless of disturbances (temperature and vibration).

According to the invention, the functions of both the control circuit for controlling the motor of the actuator of the movable-vane turbine and a rotation sensor are available.

According to the invention, the contamination of the magnetoelectric conversion device with grease lubricating the bearings and powder produced by abrasion can be suppressed.

According to the invention, the resin cover is able to hold the control circuit for controlling the motor of the actuator for the movable-vane turbine, part of the rotation sensor, and the bearing.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An electric actuator comprising:
    a body;
    a motor held on the body;
    an output shaft;
    a gearing for transmitting the rotation of the output shaft of the motor to the output shaft to drive the output shaft for rotation;
    a bearing held on the body and supporting one end of the output shaft; and
    a resin cover fixed to the body so as to cover the motor, the gearing and the other end of the output shaft;
    wherein the resin cover is provided with electric terminals capable of being plugged in and connected to the power supply terminals of the motor and combined therewith by molding, and with a bearing holding part for holding an outer race included in a bearing having an inner race fixedly mounted on the other end of the output shaft, wherein said power supply terminals of said motor and said output shaft for rotation are provided respectively at opposite ends in a longitudinal direction of said motor, and said output shaft for rotation is provided in a direction perpendicular to the rotation shaft of said motor.

2. An electric actuator
    according to claim 1, further comprising
    a lid extending in a longitudinal direction of the motor and being mounted on an inner surface of the cover to form a space, and
    a connector formed on an outer surface of the cover by one-piece molding of the cover and connecting electrically the space to an outside,
    wherein
    said position sensor is a magnetic plate mounted at the output shaft of the motor and a detection device for detecting a rotation of the magnetic plate, and
    said detection device is held inside the space.

3. An electric actuator according to claim 1,
    further comprising;
    a motor control circuit attached to the cover in a longitudinal direction of the motor and being covered by a control circuit lid mounted at the cover, and
    a bearing held on the cover for supporting one end of the output shaft,
    wherein
    said cover is provided with a partition wall separating the bearing from the control circuit, and
    said motor control circuit provided in a space composed of the partition wall, the control circuit lid and the cover is isolated from the bearing, the motor, the speed change gear and the outside of the cover.

4. An electric actuator according to claim 1, further comprising, a control circuit which controls the motor, an output shaft, a gearing which transmits the rotation of the output shaft of the motor to the output shaft to drive the output shaft for rotation, a bearing held on the body, which supports one end of the output shaft, and a resin cover fixed to the body so as to cover the motor, the gearing and the other end of the output shaft,
    wherein said control circuit is attached to the inner surface of the resin cover and is electrically connected to a connector formed on the outer surface of the resin cover, and said resin cover is provided with a partition wall holding an outer race included in a bearing having an inner race fixedly mounted on the other end of the output shaft and isolating the control circuit from the bearing, and a lid which isolates the motor from the control circuit is attached to the inner surface of the cover.

5. An electronically controlled actuator of claim 2, wherein two pairs of said magnetic plate and said detection device are provided.

6. An electronically controlled actuator of claim 2, wherein a ball bearing is fixed at the cover to support the output shaft.

7. An electric actuator according to claim 2,
    further comprising:
    a motor control circuit attached to the cover in a longitudinal direction of the motor, the motor control circuit being covered by a control circuit lid mounted at the cover, and
    a bearing held on the cover, which supports one end of the output shaft, wherein said cover is provided with a partition wall separating the bearing from the control circuit, and said motor control circuit provided in a space composed of the partition wall, the control wall, the control circuit lid and the cover is isolated from the bearing, the motor, the speed change gear and the outside of the cover.

8. An electric motor actuator according to claim 2, further comprising a control circuit which controls the motor, wherein said control circuit is attached to the inner surface of the resin cover and is electrically connected to a connector formed on the outer surface of the resin cover, and said resin cover is provided with a partition wall holding an outer race included in a bearing having an inner race fixedly mounted on the other end of the output shaft and isolating the control circuit from the bearing, and a lid which isolates the motor from the control circuit is attached to the inner surface of the cover.

9. An electronically controlled actuator of claim 3, wherein said bearing held at the cover is a ball bearing fixed at the cover.

10. An electric motor actuator according to claim 3, further comprising a control circuit which controls the motor, wherein said control circuit is attached to the inner surface of the resin cover and is electrically connected to a connector formed on the outer surface of the resin cover, and said resin cover is provided with a partition wall holding an outer race included in a bearing having an inner race fixedly mounted on the other end of the output shaft and isolating the control circuit from the bearing, and a lid which isolates the motor from the control circuit is attached to the inner surface of the cover.

11. A control apparatus for a movable vane of a turbocharger with an electronically controlled actuator, said electronically controlled actuator for driving a driven member for rotation comprising a motor, a speed change gear including an output shaft driven by the motor and capable of driving the driven member, a position sensor, and a case composed of a body and a cover, and housing the motor, the speed change gear and the position sensor, further comprising;

a power supply connector formed on the cover, which supplies power to the motor, a bearing held on the cover, which supports one end of the output shaft, a rotation extraction part for the output shaft for rotation, held on the body to connect the output shaft for rotation and the driven member for rotation, and a fixed bracket is provided at a compressor housing of a turbocharger, wherein said driven member for rotation is configured as a control mechanism for a movable vane of the turbocharger, and said electrically controlled actuator is mounted at the bracket at the side of the compressor housing so that the cover having the connector may be located at the position opposite to the turbine housing of the turbocharger.

12. A control apparatus for a movable vane of a turbocharger with an electronically controlled actuator of claim 11, wherein said position sensor is composed of a magnetic plate mounted at the output shaft of the motor and a detection device for detecting a rotation of the magnetic plate, and said detection device is mounted at the cover.

13. An electronically controlled actuator of claim 11, wherein said bearing held at the cover is a ball bearing fixed at the cover.

14. An electric actuator for driving a driven member for rotation comprising a motor, a speed change gear including an output shaft driven by the motor and capable of driving the driven member, a position sensor, and a case composed of a body and a cover, and housing the motor, the speed change gear and the position sensor, further comprising;

connecting terminals formed on an inner side of the cover to be plugged in power supply terminals formed on the motor, a connector formed outside of the cover by one-piece molding of the cover to connect with the outside, and a bearing held on an inner side of the cover, which supports one end of the output shaft for rotation, wherein mechanical support of said output shaft for rotation and an electrical connection between said power supply connector of the motor and said connector of the cover are established by an assembly comprised of said cover and said body.

15. An electronically controlled actuator according to claim 14, wherein said cover is provided with a power supply connector for supplying power to the motor on its outer surface, and terminals electrically plugged in arid connected with the power supply connector to the motor on its inner surface, and said bearing has an inner race fixedly mounted on the other end of the output shaft and an outer race fixed to the cover.

16. An electronically controlled actuator of claim 14, wherein said bearing held at the cover is a ball bearing fixed at the cover.

17. An electric actuator according to claim 14, further comprising:

a motor control circuit attached to the cover in a longitudinal direction of the motor, the motor control circuit being covered by a control circuit lid mounted at the cover, and a bearing held on the cover, which supports one end of the output shaft, wherein said cover is provided with a partition wall separating the bearing from the control circuit, and said motor control circuit provided in a space composed of the partition wall, the control wall, the control circuit lid and the cover is isolated from the bearing, the motor, the speed change gear and the outside of the cover.

18. An electric motor actuator according to claim 14, further comprising a control circuit which controls the motor, wherein said control circuit is attached to the inner surface of the resin cover and is electrically connected to a connector formed on the outer surface of the resin cover, and said resin cover is provided with a partition wall holding an outer race included in a bearing having an inner race fixedly mounted on the other end of the output shaft and isolating the control circuit from the bearing, and a lid which isolates the motor from the control circuit is attached to the inner surface of the cover.

19. An electric actuator of claim 15, wherein
said cover is formed by one-piece resin molding together with the connector, and
said resin cover is provided with electric terminals capable of being plugged in and connected to the power supply terminals of the motor and combined therewith by molding, and with a bearing holding part for holding an outer race included in a bearing having an inner race fixedly mounted on the other end of the output shaft.

* * * * *